United States Patent Office 3,481,480
Patented Dec. 2, 1969

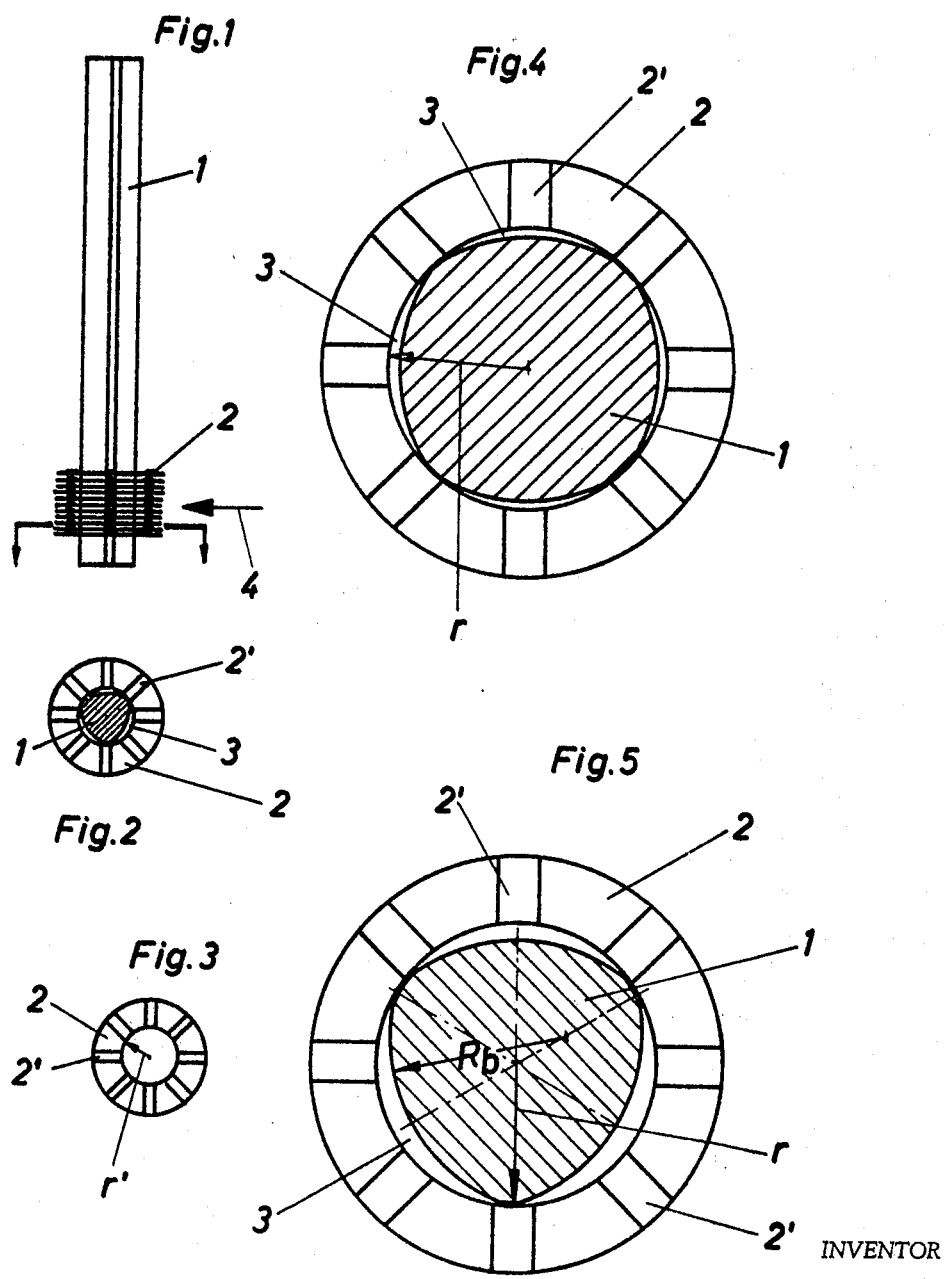

3,481,480
PROFILED ROD FOR SUPPORTING STACKED FILTER DISCS
Günter Schwinghammer, Mannheim, Germany, assignor to Enzinger-Union-Werke Aktiengesellschaft
Filed Feb. 7, 1968, Ser. No. 703,640
Claims priority, application Germany, Aug. 10, 1967, 1,611,077
Int. Cl. B01d 25/02
U.S. Cl. 210—488                                 11 Claims

ABSTRACT OF THE DISCLOSURE

The rod has a transverse cross-section which is basically a regular polygon. However, the sides of the polygon are outwardly curved, the radius of curvature of the sides being greater than that of the circle through the vertices of the polygon. Filter discs strung on the rod bear with their internal surface on the vertices of the polygon. Crescent shaped filtrate flow gaps are thereby formed between the filter discs and the supporting rod.

FIELD OF THE INVENTION

The present invention relates to a profiled supporting rod for edge filters. Individual filter discs are strung in mutually stacked relationship on such supporting rods.

The invention is classifiable in class 210, subclass 488, as apparatus for the separation of any character of material from a liquid, the apparatus comprising separable members which are arranged in superimposed relation and supporting means for the members.

DESCRIPTION OF THE PRIOR ART

Supporting rods of the type of concern in this invention are intended firstly to retain filter discs in concentrically superimposed relationship and thus assure a uniform gap width between discs and consequent uniform filtration. Secondly, they must receive the filtered liquid and discharge it in either of their opposite longitudinal directions. Filtering action occurs by flow of the liquid to be filtered from without the discs stacked on their supporting rod, through the gaps between the stacked discs, and thence as filtrate through the longitudinal filtrate discharge channels formed between the discs and their supporting rod. For this purpose of filtrate discharge, it is already known in the art to provide supporting rods with polygonal cross-sections. Thus, for example, triangular cross-sections have been used. Also, it is known to employ round bars provided at their circumferences with evenly spaced longitudinal grooves, these grooves serving for collectng and discharge of the filtered liquid. Always, the cross-sectional extremes of the supporting rod must approach within close tolerance the inner diameter of the filter discs so that the discs form a concentric, uniform stack when strung on the rod.

Filters of the type employing supporting rods and stacked filter discs thereon are employed for filtering beer and other beverages and similar liquids, generally with the concomitant use and subsequent depositing of diatomaceous earth and the like. The filtration and sediment deposition at the outside of the filter discs of such filters is frequently very uneven in the prior art and this impairs the efficiency of the filter. The inventor has found that the cause of this impairment is due to the fact that the portions of the supporting rod touching the inner walls of the filter discs are frequently too large and cover too large a cross-sectional surface of the available filtrate discharge gaps through the stacked filter discs. These larger bearing portions of the supporting rod considerably disturb the flow pattern of the liquid within the gaps between the filter discs and reduce the volume flow rate through the filter. Combined with this phenomenon there arises an uneven depositing of sediments and filtration promoting substances on the exterior of the filter discs, an uneven filtering efficiency, and a poor cohesion in the deposit of sediments and filtration promoting substances. The inventor has further found that a low-velocity flow commonly occurs in the filtrate-collecting, longitudinal channels of prior art supporting rods. This means that any solid particles which manage to remain in the filtrate become deposited. This is particularly the case when, as mentioned above, the deposit on the outside of the filter discs is not uniform. The sediment becomes deposited inside the filtrate collecting channels between the filter discs and the supporting rod and produces there, as well as within the gaps between the filter discs themselves, incrustations which eventually require the opening and cleaning of the filter stacks.

SUMMARY OF THE INVENTION

It is the object of the present invention to improve the uniformity of the deposit of sediment and filtration promoting substances on the outsides of filter discs stacked on a supporting rod and to increase the flow rate of the filtrate while simultaneously avoiding the tendency for incrustation within the filtrate removing channels of the supporting rod. While attaining these goals, the profile of the supporting rod should be capable of an accurate and simple manufacture.

In summary, the invention involves structuring a supporting rod in such a manner that cross-sectionally crescent-shaped, longitudinal filtrate discharge channels are formed between supporting rod and filter discs strung in stacked relationship thereon. These crescent-shaped channels present more open flow cross-section to gaps between the stacked filter discs, thus improving uniformity of flow in the filter. Also, the crescent shape reduces the flow cross-section of the filtrate-removal channels, thereby increasing filtrate flow velocity and preventing incrustation of the interior of the filter.

Other objects and many of the attendant advantages of this invention will be readily appreciated as the same becomes better understood by reference to the following detailed description when considered in connection with the accompanying drawings in which like reference numerals designate like parts throughout the figures thereof.

BRIEF DESCRIPTION OF THE DRAWING

FIGURE 1 is a front view of one form of the invention.

FIGURE 2 is a section along the line II—II of FIGURE 1.

FIGURE 3 is a top view of a filter disc of the invention.

FIGURE 4 is an enlarged view, corresponding to the view of FIGURE 2, of a modified form of the invention.

FIGURE 5 is an enlarged view of FIGURE 2.

DESCRIPTION OF THE PREFERRED EMBODIMENTS

In embodying the invention, the above objects are obtained by providing a supporting rod whose cross-section is a regular polygon having outwardly curved sides.

Because the cross-section of the supporting rods is a regular polygon, the bearing contacts between the supporting rod and the filter discs are kept uniformly small. This results in a uniform external deposition of sediment and filtration promoting substances. At the same time, the curving of the sides of the polygon reduces the cross-sections of the filtrate-collecting channels formed between the filter discs and the supporting rod whereby crescent-shaped flow cross-sections result. These crescent cross-sections have smaller flow cross-sectional area than was heretofore available in the art. The flow velocity is consequently higher and any solid or suspended materials which might escape into the filtrate are swept away. Incrustation of the filtrate flow system is thus effectively prevented.

While the crescent structure speeds up the flow velocity of the filtrate, it at the same time presents a maximized opening of the filtrate removal channels to gaps between the stacked filter discs.

The polygonal sides of the supporting rod are always continuously curved segments, extending between bearing points between the discs and the rod. The manufacture of such supporting rods is simple and economical. For example, the rod may be extruded to design cross-sectional dimensions and thus be ready for immediate assembly with filter discs. Moreover, the particular cross-section of the invention assures rigidity of the supporting rod without introducing the stress concentrations of sharp corners, and subsequent machining, for example the milling of grooves, is eliminated.

The radius $r$ of the circle through the bearing points at the vertices of the supporting rod's polygonal cross-section is made a tolerance less than the radius $r'$ of the circle of the internal surface of the filter discs. It is preferable to use a class 3 fit of the American Standards Association, since this allows sliding assembly of the discs with their supporting rods while still mantaining the discs in concentrically stacked relationship. A class 2 fit may be used with some discs whose design does not require the concentricity given by a class 3 fit. These fits are described in A.S.A. Bulletin B4a-1925 (as reported in "Little and Ives Complete Book of Science Illustrated," J. J. Little and Ives Co., Inc., New York, 1958, page 769). It is also possible to use the so-called "press fit" but the assembly in such zero or negative tolerance situations is more expensive.

In one form of the invention, the cross-section of the rod is basically an equilateral triangle. Its vertices, which form the bearing contact locations of the filter discs on the rod, are connected in each case by like, outwardly curved segments. The radius of curvature $R_b$ of these segments obeys the following relationship:

$$r < R_b \leq \sqrt{3r}$$

where $r$ is the radius of the circle passing through the vertices of the triangle.

Having $R_b$ greater than $r$ assures that the crescent-shaped flow cross-section will be formed. It has been found that the radius $R_b$ should not be greater than $\sqrt{3r}$, because the crescent cross-section then becomes too great and incrustation results.

While the bearing contact locations between the rod and discs is along line contacts in the construction just described, the present invention further provides in a modification that the edges between the mutually abutting, curved sides of the supporting rod be rounded off with the radius $r$. The center for the arc of this rounding off is at the center of the rod. This rounding off enables an easy threading of the filter discs onto the supporting rod. By virtue of the rounding off, two edges are produced at the two sides of the bearing contact between rod and discs. Thus, instead of three line contacts, the supporting rod will then have a total of six edges, two of which are positioned in each case directly side-by-side, separated by a small distance, for example 1 millimeter. The connecting outwardly-curved segments of radius $R_b$ will then pass between the pairs of widely spaced edges.

It has been discovered by the inventor that the ratio $R_b/r = 1.25$ gives best results for the filtration of beverages, such as beer and wine, of liquid seasoning and the like, especially when these liquids are mixed with filtration promoting substances for deposition filtering.

FIGURE 1 shows a supporting rod 1 with several filter discs strung on its lower end. The discs sit in mutually superimposed relationship, one upon the other. During filtration, the entire length of the supporting rod 1 is occupied by filter discs 2. The supporting rod is tightly sealed at the lower end thereof and connected at the upper end to a filtrate collecting pipeline so that the filtrate may be discharged through the liquid passages 3 which are formed between the supporting rod 1 and the filter discs 2. The unfiltered liquid flows approximately in the direction of the arrow 4 into the filter rod 1. The sediment and any filtration promoting substances such as suspended diatomaceous earth are deposited on the outer surface of the stack of filter discs, thus forming a filter bed.

FIGURE 1 is schematic to show the essential relationships of this invention. It is intended that the structure shown be used in an assembled filter. Thus, the supporting rod 1 and the discs 2 of the present invention are intended for assembly in the manner shown for stem 5 and discs 9 in the U.S. Patent No. 3,273,374, issued to John Frederick Annett on Sept. 20, 1966, for "Filters for Liquids."

The supporting rod 1 is shown cross-hatched in FIGURE 2. The crescent-shaped filtrate collecting channels 3 are formed by the profiled configuration of the supporting rod 1 and the inner wall of the filter disc 2. Disposed on the filter disc 2 are raised spacer surfaces 2'. These determine the height of the gap between the discs when they are stacked on the supporting rod 1.

FIGURE 3 is a top plan view of a filter disc 2 assemblable with the supporting rod 1 and having the bore radius $r'$.

In the form of the invention shown in FIGURE 4, the supporting rod 1 has an approximately square cross-section. However, its sides are outwardly curved and reduce, as a result, the cross-sectional area and width of the filtrate removal channels 3 between the supporting rod 1 and the inner walls of the stack of filter discs 2. The outwardly curved sides are smooth and without projections to promote high filtrate flow velocity within the channels 3 in order to avoid with certainty incrustation by any solid substances that might accidentally get into the filtrate.

In the form of the invention shown in FIGURE 5, the supporting rod 1 has a basically equilaterally triangular cross-section. The radius $R_b$ of the outwardly curved sides is greater than the radius $r$ and less than or equal to $\sqrt{3r}$. The three edges of the supporting rod 1 are rounded off with the radius $r$. Arranged on the individual filter discs 2 are spacer surfaces 2' which determine the distance across the gap between the discs when they are stacked on the supporting rod.

In the place of curved triangles and curved quadrangles, it is also possible to utilize curved polygons of more sides. The use of curved triangles of $R_b/r$ equals 1.25 for the cross-sectional profile of the supporting rod has been found to be particularly favorable. In one embodiment of the invention, the drawings of the figures are to scale.

It should be understood, of course, that the foregoing disclosure relates to only preferred embodiments of the invention and that it is intended to cover all changes, modifications and combinations of the examples of the invention herein chosen for the purposes of the disclosure, which do not constitute departures from the spirit and scope of the invention set forth in the appended claims.

What is claimed is:

1. A profiled supporting rod for internally supporting stacked filter discs, the transverse cross-section of said rod having a plurality of radial extremes, in combination with filter discs stacked substantially concentrically in bearing contact with said extremes, the sides of the cross-section between the radial extremes being outwardly curved, said filter discs forming crescent-shaped gaps with said sides when the discs are stacked on the rod.

2. A profiled supporting rod as claimed in claim 1, the position of the radial extremes being uniformly a distance $r$ from the center of the rod, the outwardly curved sides having a radius of curvature $R_b$, $R_b$ being greater than $r$.

3. A profiled supporting rod as claimed in claim 2, said cross-section having the basic shape of a regular polygon, the radial extremes being at its vertices.

4. A profiled supporting rod as claimed in claim 3, said regular polygon being an equilateral triangle, the radius of curvature being less than or equal to $\sqrt{3}r$.

5. A profiled supporting rod as claimed in claim 2, said radial extremes being rounded off with the radius $r$.

6. A profiled supporting rod as claimed in claim 2, the ratio of $R_b$ to the radius $r$ being substantially equal to 1.25.

7. A profiled supporting rod as claimed in claim 2, further comprising a plurality of filter discs each having a cylindrical internal bore of radius $r'$, the relationship between $r$ and $r'$ being such that the discs may be slid onto the rod and may stack substantially concentrically thereon.

8. A profiled supporting rod as claimed in claim 3, further comprising a plurality of filter discs each having a cylindrical internal bore of radius $r'$, the relationship between $r$ and $r'$ being such that the discs may be slid onto the rod and may stack substantially concentrically thereon.

9. A profiled supporting rod as claim in claim 4, further comprising a plurality of filter discs each having a cylindrical internal bore of radius $r'$, the relationship between $r$ and $r'$ being such that the discs may be slid onto the rod and may stack substantially concentrically thereon.

10. A profiled supporting rod as claimed in claim 5, further comprising a plurality of filter discs each having a cylindrical internal bore of radius $r'$, the relationship between $r$ and $r'$ being such that the discs may be slid onto the rod and may stack substantially concentrically thereon.

11. A profiled supporting rod as claimed in claim 6, further comprising a plurality of filter discs each having a cylindrical internal bore of radius $r'$, the relationship between $r$ and $r'$ being such that the discs may be slid onto the rod and may stack substantially concentrically thereon.

References Cited
UNITED STATES PATENTS

| | | | |
|---|---|---|---|
| 2,270,370 | 11/1956 | Griffiths | 210—344 |
| 3,273,374 | 9/1966 | Annett | 210—488 X |

REUBEN FRIEDMAN, Primary Examiner

JOHN W. ADEE, Assistant Examiner

U.S. Cl. X.R.

210—541